Oct. 17, 1961  D. B. SAVORY  3,005,166
CONDITION RESPONSIVE OSCILLATOR
WITH PROTECTIVE CONTROL MEANS
Filed May 1, 1958
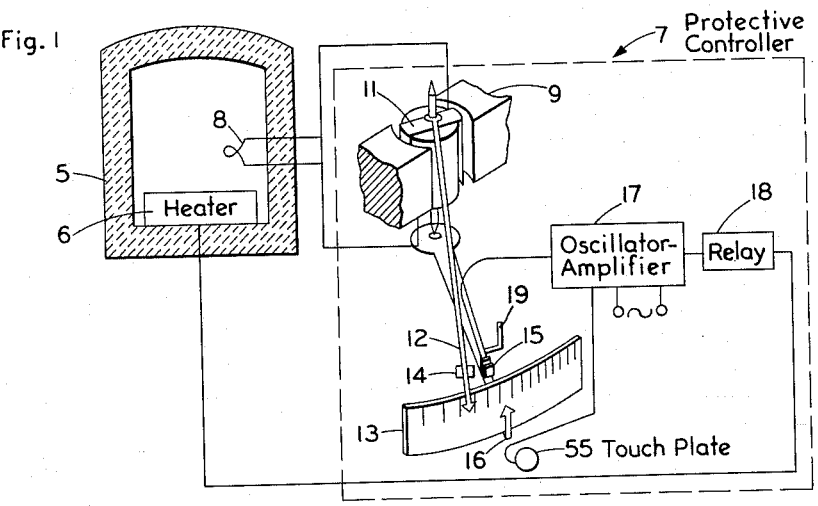
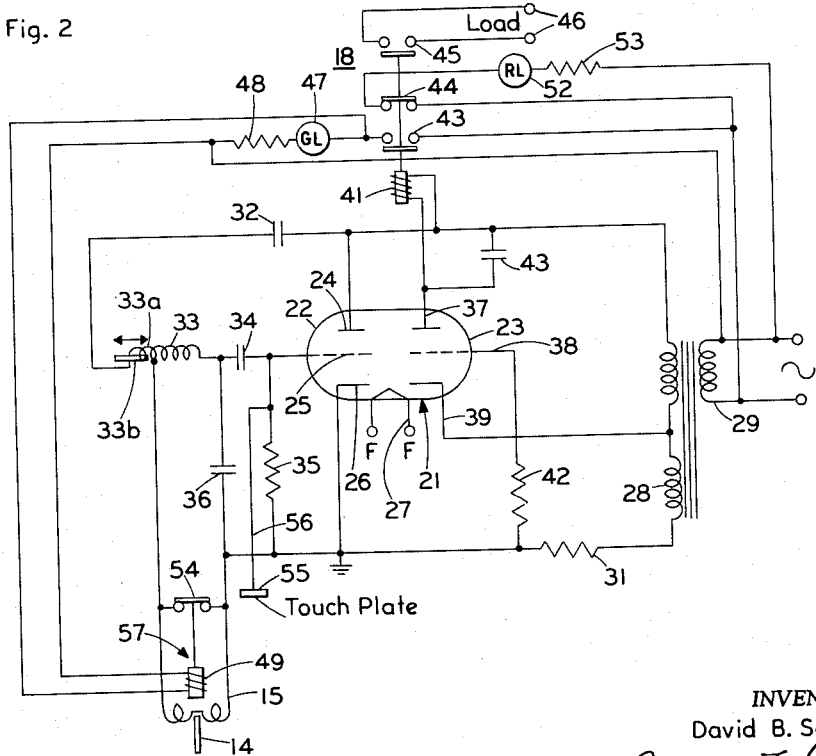
INVENTOR.
David B. Savory
BY Robert F. Peck
His Attorney

United States Patent Office 3,005,166
Patented Oct. 17, 1961

3,005,166
CONDITION RESPONSIVE OSCILLATOR WITH PROTECTIVE CONTROL MEANS
David B. Savory, Marblehead, Mass., assignor to General Electric Company, a corporation of New York
Filed May 1, 1958, Ser. No. 732,392
7 Claims. (Cl. 331—62)

This invention relates generally to improvements in protective control apparatus and more particularly to improvements in apparatus of this type which embodies an oscillator as the primary controlling element.

Heretofore, it has been common to use an oscillator as a condition controlling device in which a condition responsive element is utilized to control the oscillatory condition of the oscillator in response to changes in the controlled condition, with the change in oscillatory condition being in turn utilized to effect a control operation. See, for example, U.S. Patent 2,584,728, Michel, issued February 5, 1952, for a disclosure of such a controller.

Ordinarily, a relay in the output circuit of the oscillator has been employed to perform the control function and where the relay also functioned as a protector, it has been the practice to provide lock-out means and pushbuttons to allow such action.

For example, in the case of a protective pyrometer utilized to monitor a heating furnace, the oscillator control unit was arranged to shut down the furnace at a pre-set furnace temperature and to then lock itself out of the control circuit to thereby prevent further heating of the furnace even if the control unit called for more heat. Such lock-out was usually accompanied by an alarm signal, either visual or audible, which would signify to an operator that the pre-set temperature had been reached and that the furnace was shut down. A mechanically operated momentary push button switch was provided with such controllers to restore the unit to service and it was necessary for an operator to actuate this push-button in the event that heat was to be returned to the furnace.

Sometimes, the aforesaid type of controller was used solely as a protective device in combination with other primary control units, and set to deactivate the primary control unit or give an alarm in the event that the controlled condition tended to exceed its normal maximum controlled value. Thus, the protector could be set to respond to a furnace temperature slightly above the temperature required to be maintained in a furnace, so that any abnormal furnace operation causing temperatures to rise above the desired value would be detected and terminated, either by the protective unit itself, or by an operator responding to the alarm signal given off by the protector.

In any event, whether such protectors functioned as controllers as well as protectors, they would have the lock-out feature together with a push-button for restarting the system upon return of the condition to a safe value. The use of push-buttons in such protectors has a number of disadvantages, not the least of which is their cost, for they are also subject to mechanical failure, they require power leads brought to the control panel, and they add to the maintenance and servicing problems of the equipment.

Therefore, it is a primary object of this invention to provide a protective control device which permits a locked-out controlled system to be quickly and reliably restarted without the use of mechanical switches or similar push-button operated devices.

It is another object of the invention to provide an improved protector having a greatly simplified restarting arrangement that not only permits quicker and easier restarting, but does so with a less expensive arrangement, fewer parts, and reduced maintenance over devices heretofore used for such purposes.

Briefly, and in one aspect thereof, the invention comprises the use of a metallic plate connected by a single wire to an oscillator protective control unit which, when touched by an operator, establishes the proper oscillatory condition in the oscillator for restarting a controlled system. A simplified protective by-pass for system lockout is achieved through a short-circuitry arrangement in the input circuit of the oscillator and the plate is so connected in the oscillator that it overrides the protective lock-out arrangements and takes over the control of the oscillator. When a condition being controlled by such a device is below its predetermined set value upon restart, the controlled system will run after restart to drive the condition toward the set point. If the condition being controlled is already at its desired set-point, restart of the system will cause only a momentary surge in the system after which it will be shut down and locked out until such time as the restart plate is touched again.

The restart plate may also be used to start up the control system after initial installation of the protector; touching the restart plate after installation will also allow the protector to ready itself for any required operation when in service.

The objects of the invention, together with its attendant benefits and advantages, will be more readily understood upon reference to the detailed description set forth below, particularly when taken in conjunction with the drawing annexed hereto in which:

FIGURE 1 is a substantially schematic arrangement of a protective control device with an associated electric furnace; and FIGURE 2 is a circuit diagram of the improved protective controller.

Referring first to FIGURE 1, there is shown in schematic form a typical process to which the invention may be applied comprising a furnace 5 which contains an electric heating unit 6 adapted to be controlled by the protective controller 7 which senses the temperature within the furnace through a detector in the form of thermocouple 8.

The thermocouple is connected to a suitable millivoltmeter, part of which is shown at 9, which may be of the high resistance, permanent magnet, moving coil type. The millivolt output of the thermocouple causes deflection of the moving coil 11 forming a part of the millivoltmeter and as the coil moves, it carries an associated pointer 12 across a suitable indicating scale 13. Secured to the pointer 12 near its outer end is a metallic vane 14 which is adapted to cooperate with a pair of spaced sensing coils shown at 15 mounted on a pivotally mounted set-point adjusting arm 16.

The coil and vane assembly may be of the type shown and described in the aforesaid Michel patent and comprises a pair of serially connected, flat, spirally wound pancake coils arranged side by side with a space between on a suitable supporting structure. The coils are thus inductively related to each other such that the insertion of the vane 14, which may be of any suitable electrically conducting material such as copper, will reduce the mutual inductance between the coils and also reduce their self inductance.

This effect is utilized to control the action of an oscillator amplifier 17 which in turn will control the action of a relay 18 which, as shown in FIGURE 1, will control the action of heater 6.

Positioning of the set-pointer 16 along the scale 13 will enable the temperature of the furnace to be established within any predetermined limits and the action of the coil and vane assembly, together with the oscillator amplifier, will serve to control the temperature of the furnace at the set-point of the control unit.

A pointer stop 19 is shown to prevent the vane 14 from going beyond the space between the coil assembly 15.

The action of the oscillator will be best understood upon reference to FIGURE 2 wherein there is shown a twin triode 21 comprising an oscillating half 22 and a repeater or amplifier half 23.

Considering first the oscillator portion of the twin triode, it is seen that it has a plate 24, and a grid 25 and a cathode 26, together with a suitable filament 27 which may be used to heat both cathodes within the tube.

The oscillator 22 is substantially similar to the oscillator shown in the aforesaid Michel patent and its action will be described but briefly since reference to the patent will afford a complete description of this type of oscillator controller.

Thus, the oscillator has an output circuit which includes the secondary 28 of an A.C. energizing transformer, the primary of which is shown at 29. Also included in the output circuit of the oscillator 22 is a resistor 31 across which a predetermined variable voltage drop can be developed in response to changes in the oscillatory condition of the oscillator.

The anode 24 is also connected to the input circuit of the oscillator through a condenser 32 and inductor 33. The plate is connected to one end of the inductor and the other end of the inductor is connected through a grid circuit condenser 34 to the grid 25 of the oscillator. Connected near the plate end of inductor 33 is a lead from the serially connected sensing coils 15 with the other end of the sensing coils connected by a suitable lead to the cathode return of the oscillator. Grid leak resistor 35 is connected between the grid and cathode of the oscillator 22 such that the oscillator is self-biasing, and a condenser 36 is connected across the main portion of inductor 33 via the sensing coils 15 to form the parallel resonant circuit of the oscillator.

As is clearly described in the aforesaid Michel patent, the portion 33a of the inductor 33 between the plate and sensing coils acts as a tickler coil for regenerative feedback and enables the oscillator to develop sustained oscillation as required. It is to be noted that the inductor is provided with an axially adjustable iron core member 33b which is provided to compensate for manufacturing tolerances in order to permit slight adjustments in feedback to allow the pointer 12 to line up properly with the set-point at the stabilized operating condition of the particular process being controlled. Adjustment of member 33b moves the operating point of the controller up scale or down scale as desired, providing a range in adjustment of +1.0% of full scale.

As explained in the Michel patent, the sensing coils 15 function as a degenerative feedback coupling which substantially cancels the regenerative feedback when the vane 14 is wholly without the space between the coils such that a low level oscillatory condition is established which allows substantially maximum current in the output circuit of the oscillator. Referring to the process shown in FIGURE 1, this condition would prevail when the heater is first energized and during the time when the temperature within the furnace is being brought up to the required set-point.

To avail of the current in the load circuit of the oscillator as a means of controlling the heater 6, there is provided the amplifier 23 which has a plate 37, grid 38 and cathode 39. The amplifier 23 is energized from the source 29 through a tapped portion of secondary 28 and its output circuit includes the winding 41 of relay 18. Bias on the grid of the amplifier is derived from a fixed tap on secondary 28, together with the resistor 42 and the voltage drop across resistor 31. A condenser 43 is connected across the relay winding.

When the current in the output circuit of oscillator 22 is at a maximum, which corresponds to an initial oscillatory condition of the oscillator, the voltage drop across resistor 31 is correspondingly at a maximum. Since in the circuit shown the fixed tap in the grid circuit of amplifier 23 develops 30 volts, the resistor 31 is such that with the maximum current of about five milliamperes flowing, its voltage drop is about 32 volts and is of opposite polarity to the fixed voltage derived from the tap on secondary 28. This results in about +2 volts on grid 38 which allows the amplifier 23 to conduct the energize relay winding 41.

Associated with winding 41 are a plurality of single-pole single-throw switches 43, 44, 45 with the switch 45 being used to control the heater 6 through an external load circuit which includes terminals 46. Switches 43, 44, and 45 are shown in their positions corresponding to de-energization of relay coil 41 and it is apparent that when the output circuit of the oscillator is drawing maximum current, the switch 45 will be closed to energize heater 6.

Upon increase in furnace temperature, the vane 14 will move until it enters between the coils 15. Upon this occurring, the effect of the degenerative feedback is reduced and the input circuit of the oscillator will develop an increasing negative signal on grid 25 which, upon reaching the appropriate value, will change the oscillatory condition in the oscillator in such a way that the current in the oscillator output circuit will be materially reduced. A much higher level of oscillation will be established at this point and with the drop in current in the load circuit, the voltage drop across resistor 31 will be reduced to about 6 volts. This will place large negative bias on the grid of amplifier 23, causing it to cut off and de-energize relay winding 41. Upon this happening, switch 45 will open to shut off the heater.

So far the action described is conventional and conforms with the action of the oscillator controller shown in the aforesaid Michel patent.

In order to have the oscillator also function as a protector, the switches 43, 44 and associated circuitry are provided; switch 43 controlling energization of a circuit including a green indicating lamp 47, a current limiting resistor 48, and the winding 49 of a locking relay 57 and switch 44 controlling energization of a circuit including a red warning lamp 52 and current limiting resistor 53.

Forming a part of lock-out relay 57 is the switch 54 connected across the sensing coils 15. Switch 54 is shown closed, corresponding to de-energization of coil 49.

A metallic plate 55 connected by lead 56 to the grid side of grid leak resistor 35 completes the protector portion of the oscillator.

Assuming, as above, that the temperature in furnace 5 has come up to its set-point, the coil 41 will be de-energized, causing switch 43 to open and switch 44 to close. When switch 43 opens, coil 49 will be de-energized and switch 54 will close, short-circuiting the sensing coils 15 to thus by-pass them insofar as the oscillator is concerned. The oscillator will now continue oscillating at its high level even if the temperature in the furnace falls and the vane 14 moves out of the coil 15, for the coil and vane unit are no longer effective in controlling the oscillatory condition of the oscillator. The oscillator is thus locked-out and can exercise no further control on the heating unit 6.

Coincident with lock-out of the oscillator, the red warning lamp 52 is energized and will continue to burn, thus indicating to an operator that the protector portion of the controller has taken over to shut off the furnace.

Assuming that it is subsequently desired to restore furnace operation, the operator will merely touch plate 55, which is brought out to the front of the control panel in which the control unit is mounted (see the schematic showing in FIGURE 1), and the body capacity of the operator introduced into the oscillator input circuit will de-tune the oscillator and cause oscillations to cease. When this happens, and assuming that the vane 14 is out of coil assembly 15, relay winding 41 will be energized to close switch 45 and restore power to the heater 6. Coincident with closure of switch 45 will be closure of switch 43 and opening of switch 44. When switch 44 opens, the warning lamp goes out and when switch 43 closes, green lamp 48 goes on to show furnace action and locking relay 57 is energized to open switch 54 and remove the by-pass across the coil and vane unit. The coil and vane unit will then take over control of the oscillatory condition of oscillator 23 and the controller will function in a normal manner until such time as it is locked out again upon attainment of the set-point temperature in the furnace.

If it is desired to have the controller function primarily as a protector, the switch 45 may be eliminated, or it can be placed in series with whatever primary control unit is employed, in which event the set-point of the protector will be moved up scale from the furnace set-point so that the protector will not function in response to normal On-Off operation of the furnace but only when the furnace temperature gets abnormally high. However, here again, if the furnace temperature does get out of control and start to shoot up, the protector will turn on the red warning lamp and if load switch 45 is used, shut off the furnace and lock it out of service.

Again, to restart the furnace, the plate 55 is touched, after which normal operation of the protector is restored.

It is also to be noted that the plate 55 is used to start up the equipment after initial installation, for in such condition, the relays 18 and 57 will both be de-energized. After applying power to the controller and allowing sufficient time for the controller to warm up, touching the plate will change the oscillatory condition of the oscillator to energize relays 18 and 57 and turn over control of the oscillator to the coil and vane unit.

From the above, it is seen that lock-out of the controller and restart of the controlled circuit is accomplished quite simply and easily. No expensive mechanical switches or push-buttons are required for restart, since all that is needed is a single wire brought out from the input circuit of the oscillator for connection to the metallic touch plate. There are no mechanical parts to fail or require service, as in a push-button restarting device, nor is it necessary to bring power leads to the control panel for restart purposes.

Additionally, the arrangement is such that failure of either relay 18 or 57 automatically locks out the load circuits. Also, failure of either part of the twin-triode 22 results in automatic lock-out.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. Protective control apparatus comprising, in combination: an oscillator having an input circuit and an output circuit; condition responsive means in said input circuit for changing the oscillatory condition of said oscillator when said condition attains a predetermined magnitude; protective means in said input circuit responsive to said change in oscillatory conditions and operating to fix the frequency of the oscillator and prevent said condition responsive means from effecting further changes in said oscillatory condition once said condition has reached said predetermined magnitude; and a stationary metallic plate connected in said input circuit which when touched changes said oscillatory condition.

2. Protective control apparatus comprising, in combination: an oscillator having a first oscillatory condition and including input and output circuits; condition responsive means in said input circuit for detuning and for changing said oscillator to a second oscillatory condition when said condition attains a predetermined magnitude; protective means in said input circuit operative when said oscillator changes to said second oscillatory condition to prevent said condition responsive means from effecting further changes in said oscillatory condition; and a metallic plate connected in said input circuit which when touched after operation of said protective means changes the electrical characteristics of said input circuit and said oscillator to said first oscillatory condition.

3. Protective control apparatus comprising, in combination: an oscillator having a first oscillatory condition and including input and output circuits; a condition responsive circuit element connected in said input circuit functioning to detune said oscillator to a second oscillatory condition when said condition attains a predetermined magnitude; protective means in said input circuit operative when said oscillator changes to said second oscillatory condition to by-pass said circuit element whereby it is prevented from effecting further changes in said oscillatory condition; and a metallic plate connected in said input circuit of said oscillator which when touched adds capacity to said input circuit to establish said first oscillatory condition.

4. Protective control apparatus comprising, in combination: an oscillator having an input circuit and an output circuit; means including a condition responsive element and a metallic plate in said input circuit for controlling the oscillatory condition of said oscillator; said condition responsive element having an electrical characteristic which changes in response to changes in said condition to establish first and second oscillatory conditions of said oscillator, said oscillator changing from said first to said second oscillatory condition when said condition attains a predetermined magnitude; and protective means in said input circuit of said oscillator operative when said second oscillatory condition is established to prevent said condition responsive element from effecting further control on said oscillatory condition; said metallic plate when touched changing the electrical characteristics of said input circuit to establish said first oscillatory condition, said plate controlling the oscillatory condition of said oscillator for any characteristic of said condition responsive element.

5. Protective control apparatus comprising, in combination: an oscillator having a first oscillatory condition and including input and output circuits, said output circuit having a first current level corresponding to said first oscillatory condition; condition responsive means in said input circuit for detuning said oscillator to a second oscillatory condition when said condition attains a predetermined magnitude; the current in said output circuit changing to a second level corresponding to said second oscillatory condition; protective means in said input circuit of said oscillator operative in response to changes in said current level to prevent said condition responsive means from effecting further changes in said oscillatory condition; and a metallic plate connected in said input circuit which when touched after operation of said protective means changes said oscillator to said first oscillatory condition, the current in said output circuit changing to said first level when said plate is touched, said protective means operating in response to said last-named change in current level to permit said condition responsive means to once again effect changes in said oscillatory condition in accordance with changes in said condition.

6. Protective control apparatus comprising, in combination: an oscillator having a first oscillatory condition and including an input circuit and an output circuit; a condition responsive coil and vane unit connected into said input circuit for controlling the oscillatory condition of said oscillator, said vane moving in response to changes in the magnitude of said condition to change the electrical characteristic of said coil, said coil having a characteristic corresponding to a predetermined magnitude of said condition which effects a change in said oscillator to a second oscillatory condition; protective means including a normally open switch connected across said coil and switch actuating means responsive to changes in said oscillatory condition, said actuating means operating to close said switch when said second oscillatory condition is established, said coil being by-passed when said switch is closed whereby it cannot effect further control on said oscillatory condition; and a metallic plate connected in said input circuit which when touched adds capacity to said input circuit to establish said first oscillatory condition.

7. A protective pyrometer comprising in combination: an oscillator having input and output circuits; a temperature responsive element in said input circuit for controlling the oscillatory condition of said oscillator, said oscillator having a first oscillatory condition corresponding to a first range in said temperature and having a second oscillatory condition corresponding to temperatures exceeding said range; a control relay in said output circuit responsive to changes in said oscillatory condition; a protector relay controlled by said control relay, said protector relay including a switch which is closed across said temperature responsive element when said second oscillatory condition is established, said switch when closed across said element operating to by-pass said element to prevent said element from effecting further changes in the oscillatory condition of said oscillator; and a physically stationary metallic restart plate connected into said input circuit which when touched, establishes said first oscillatory condition.

References Cited in the file of this patent

UNITED STATES PATENTS

| | | |
|---|---|---|
| 2,228,163 | Cohen | Jan. 7, 1941 |
| 2,448,541 | Maxson | Sept. 7, 1948 |
| 2,584,728 | Michel | Feb. 5, 1952 |
| 2,684,456 | Sidebottom | July 20, 1954 |
| 2,782,308 | Rug | Feb. 19, 1957 |